United States Patent [19]

Kelman

[11] Patent Number: 5,200,252
[45] Date of Patent: Apr. 6, 1993

[54] REINFORCED FASTENING BOSS AND METHOD FOR MAKING THE SAME

[75] Inventor: Josh Kelman, Dover, N.H.
[73] Assignee: Davidson Textron Inc., Dover, N.H.
[21] Appl. No.: 915,317
[22] Filed: Jul. 20, 1992
[51] Int. Cl.⁵ .......................... B32B 1/00; B32B 3/02; B32B 5/14
[52] U.S. Cl. ..................................... 428/159; 156/78; 156/245; 264/45.1; 264/271.1; 428/160; 428/317.9; 428/319.7
[58] Field of Search ................. 156/78, 245; 264/45.1, 264/271.1; 428/159, 160, 317.9, 319.7

[56] References Cited
U.S. PATENT DOCUMENTS

| | | | |
|---|---|---|---|
| 4,325,178 | 4/1982 | Pruehs | 29/458 |
| 4,446,185 | 5/1984 | Waragai et al. | 428/67 |
| 4,456,644 | 6/1984 | Janz et al. | 428/139 |
| 4,477,504 | 10/1984 | Bailey et al. | 428/159 |
| 4,663,210 | 5/1987 | Schreiber et al. | 428/160 |
| 4,713,202 | 12/1987 | Booth et al. | 264/46.5 |
| 4,743,188 | 5/1988 | Gray et al. | 425/123 |
| 4,793,784 | 12/1988 | Belleville et al. | 425/111 |
| 4,806,094 | 2/1989 | Rhodes, Jr. et al. | 425/543 |
| 4,902,362 | 2/1990 | Stewart et al. | 156/79 |

Primary Examiner—William J. Van Balen
Attorney, Agent, or Firm—Reising, Ethington, Barnard, Perry & Milton

[57] ABSTRACT

A composite plastic article is provided which includes an improved boss for fastening the article to a supporting structure. The composite article includes a decorative outer skin co-molded to a reinforced foam layer. The foam layer is formed from a foaming resin such as polyurethane in an exothermic reaction. The boss is formed as a part of the foam layer and protrudes through the insert. A metallic fibrous material such as steel wool is molded into the boss to give the boss added structural integrity and to remove heat generated during formation of the boss and foam layer to thereby reduce cracking of the boss and localized blistering and delamination of the outer skin. A method for making such a boss is also provided.

12 Claims, 2 Drawing Sheets

REINFORCED FASTENING BOSS AND METHOD FOR MAKING THE SAME

BACKGROUND OF THE INVENTION b 1. Field of the Invention

The present invention relates generally to a boss or protrusion for fastening the boss to an object and to a method for making such a boss. More particularly, the invention relates to a boss integrally formed on a composite plastic article and which contains a fibrous metallic material which acts to reinforce the boss and to remove heat generated during formation of the boss.

2. Description of the Related Art

Molded composite plastic articles having a foam layer between an outer decorative skin and a rigid plastic insert have been widely used in the manufacture of automobile interior components such as instrument panels, cushions, and arm rests. The rigid plastic insert provides structural integrity to the composite article and is useful for attaching the article to a supporting structure. Typically, the outer skin and insert are preformed in separate processes. These preforms are then placed on opposing sides of a mold (if not previously formed therein) and the intermediate cavity is filled with polyurethane or some other suitable compound to produce the composite plastic article. Examples of the many variations of this molding process can be found in U.S. Pat. Nos.: 4,902,362 to P. J. Stewart et al., entitled "Applique Assembly Method for Automotive Instrument Panels;" 4,806,094 to R. D. Rhodes, Jr. et al., entitled "Injection Molding Apparatus for Forming Film Covered Inserts for Instrument Panels;" 4,793,784 to E. L. Belleville et al., entitled "Apparatus for Making Foamed Articles;" and 4,743,188 to J. D. Gray et al., entitled "Apparatus for Sealing a Pour Head in a Mold for Forming Composite Products."

One disadvantage of such a composite article is that it requires at least three major manufacturing steps; namely, formation of (1) the outer skin, (2) the rigid insert, and (3) the intermediate foam layer. To reduce the complexity of manufacturing such articles, a reinforcing layer of woven fiberglass or other suitable material is sometimes incorporated into the foam layer to provide structural integrity to the composite article to thereby eliminate the need for the rigid plastic insert. Additionally, unitary fastening bosses are formed on the foam layer opposite the outer skin to permit fastening of the article to a supporting structure.

These fastening bosses are typically formed by recesses in the mold located on a surface of the mold opposite the outer skin. The manufactured composite article can then be fastened to its support by screws threaded into the upper surfaces of the bosses. To effectively secure the composite article to its support, each boss must have sufficient structural integrity to hold the screw threads. To this end, small amounts of fiberglass are sometimes inserted into the mold recess which forms the boss or mixed with the foaming resin to form a fiberglass reinforced foam boss. More complicated arrangements have been suggested to permit attachment of the composite article. For example, U.S. Pat. No. 4,446,185 to K. Waragai et al., entitled "Reaction Injection Molded Article with Threads and Method of Molding Same," discloses threaded inserts provided within the bosses and held in place by a surface layer of relatively high density. U.S. Pat. No. 4,325,178 to L.L. Pruehs, entitled "Screw Anchoring Device and Method," discloses a screw anchoring device mounted over an aperture in a panel which permits an insulating material to be foamed between the panel and a spaced wall without egress of the insulating material through the aperture. These arrangements are not entirely desirable, however, because they require additional parts which increase the cost and complexity of manufacturing.

Thermoset foaming resins such as polyurethane are typically used in forming the foam layer. These resins are chemically produced in an exothermic reaction which results in a foaming resin that is allowed to expand to fill the mold cavity. One problem encountered when using such resins is that the heat generated by the reaction can create cracks in the boss and blistering and delamination of the outer skin in the region surrounding the boss, as well as undesirable sink marks in composite articles manufactured with hard outer skins. This localized overheating occurs as a result of the larger local volumes of resins needed to form the boss.

Others have addressed other types of delamination problems in composite layered articles. See, for example, U.S. Pat. No. 4,713,202 to L. D. Booth et al., entitled "Process for Reducing the Distortion of Multi-layered Laminates." This patent does not address the blistering and delamination caused by excessive local temperatures arising during the molding process, but rather is concerned with reducing distortion of multi-layered laminates caused by temperature dependent dimensional changes of the various layers. There remains, therefore, a need for a composite plastic article which includes one or more fastening bosses having suitable structural integrity for its intended purpose and which can be manufactured without cracks and without causing blistering and delamination of the outer skin in the region surrounding the boss.

SUMMARY OF THE INVENTION

The present invention overcomes the aforementioned shortcomings of prior art fastening bosses by providing a composite plastic article having a unitary boss which includes a fibrous material having a high thermal conductivity. The boss can be formed as part of a layer of foam resin which is co-molded to a decorative outer skin. The fibrous material improves the structural integrity of the boss to aid in retaining the threads of a screw used to fasten the composite article to its support. Additionally, heat generated by the exothermic reaction during formation of the foam layer and unitary boss is conducted by the fibrous material to the mold where it is dissipated to thereby reduce or eliminate localized blistering and delamination of the various layers of the composite article.

A boss formed in accordance with the present invention can be manufactured as part of a solid layer of resin in a mold process which includes: placing a plug of metallic fibrous material into a recess in the mold; forming a solid layer of resin within the mold by an exothermic reaction; and conducting part of the heat generated by the reaction through the metallic fibrous material to the mold. This process can be used as part of a larger manufacturing cycle to produce a composite plastic article. Additionally, a composite plastic article having a foam layer co-molded to a preformed outer skin can similarly be manufactured in a process in which the plug is attached to the preformed insert rather than being placed within the mold recess.

BRIEF DESCRIPTION OF THE DRAWING

The preferred exemplary embodiments of the present invention will hereinafter be described in conjunction with the appended drawings, wherein like designations denote like elements, and.

DESCRIPTION OF THE PREFERRED EMBODIMENTS

Figure 1:
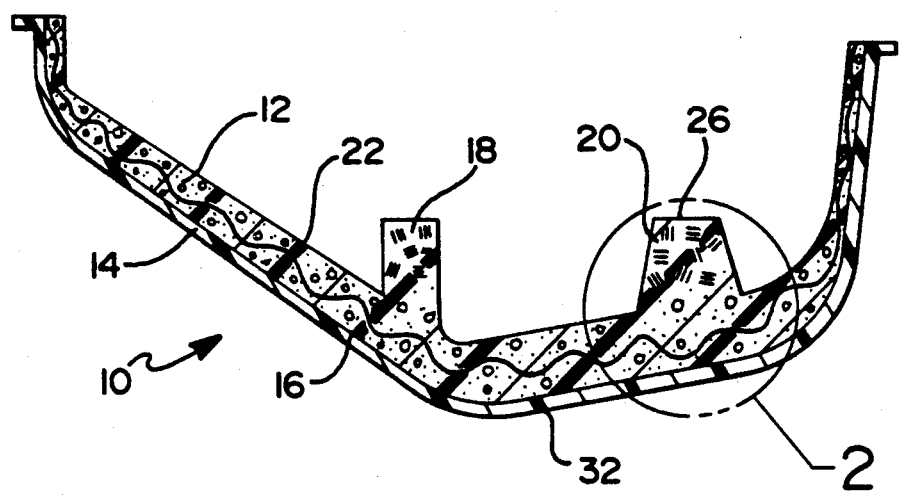
FIG. 1 is a cross-sectional view of a composite plastic article of the present invention which includes a pair of bosses.

As shown in FIG. 1, a composite plastic article of the present invention, designated generally as 10, includes a foam layer 12 and an outer skin 14. Outer skin 14 is co-molded to a surface 16 of foam layer 12. Foam layer 12 includes a pair of unitary bosses 18, 20 which protrude from a second surface 22 of foam layer 12.

Figure 2:
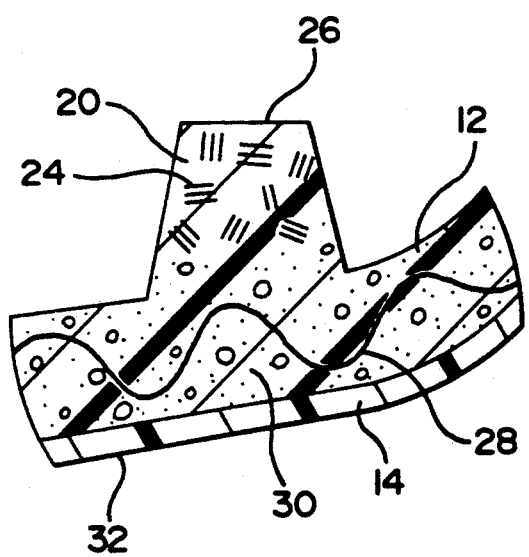
FIG. 2 is an enlarged cross-sectional view of the composite article of FIG. 1 showing the details of one of the bosses.

Bosses 18, 20 permit article 10 to be fastened to a supporting structure (not shown) and each include a plug of metallic fibrous material 24, such as steel wool. Fibrous material 24 provides structural integrity to bosses 18, 20 and aids in removing heat from article 10 during its formation. As best seen in FIG. 2, fibrous material 24 is depicted by groups of short, parallel lines interspersed among the foam resin that comprises foam layer 12.

Although the embodiment depicted in FIG. 1 includes a pair of bosses, it will be understood by those skilled in the art that any number of bosses can be used, as the design requirements of article 10 dictate. To simplify the description and understanding of the present invention, only the details of construction of boss 20 will hereinafter be described. Of course, such details are meant to apply equally to boss 18 as well as any other bosses utilized for fastening article 10 to its supporting structure. Additionally, it will be understood that the cross-sectional shape of composite article 10 shown in FIG. 1 is diagrammatical only and the actual shape of article 10 will depend upon various known functional and aesthetic design requirements.

As shown in FIG. 2, boss 20 includes an upper surface 26 into which a screw can be threaded to fasten article 10 to its supporting structure. Fibrous material 24 is preferably located throughout boss 20 and especially proximate upper surface 26. This provides needed structural integrity to boss 20 in the location in which it will engage the threads of a fastening screw and, as described below in greater detail, increases the removal of heat generated during formation of foam layer 12 to reduce and/or eliminate blistering and delamination. Additionally, a non-soluble material such as steel wool used for fibrous material 24 aids in the filling of boss 20 so that boss 20 is less likely to blister or delaminate. The dimensions of boss 20 will depend upon considerations which are known to those skilled in the art and which are not at all pertinent to the present invention, except that the greater the size of boss 20, the greater the likelihood of blistering and delamination of outer skin 14 and, therefore, the more advantageous the use of the present invention.

Boss 20 is preferably formed as a unitary extension of foam layer 12. However, boss 20 can be separately formed and adhered or molded to composite article 10 without departing from the scope of the present invention. Foam layer 12 preferably comprises a low density mat formed by a matrix of reinforcing material such as woven fiberglass 28 molded within a thermoset foam resin 30 such as Rimline 8709B/8700A manufactured by ICI Americas, Inc. Preferably, foam resin 30 has a density of 0.42 specific gravity, a flex modulus of 640 MPa, and a tensile strength of 12 MPa. Other resins suitable for forming foam layer 12 include the Baydur formulation manufactured by Mobay and the Elastogran formulation manufactured by BASF.

Fibrous material 24 can be any material having a high thermal conductivity; i.e., fibrous material 24 can comprise any of the numerous types of materials not generally considered to be insulators. Moreover, fibrous material 24 need not actually be in the form of individual or woven fibers, but instead can be in a granular or other form as long as boss 20 is structurally reinforced and heat is sufficiently transferred away from boss 20 during manufacture to reduce or eliminate the likelihood of localized blistering and delamination.

Outer skin 14 has an outer surface 32 which forms the exposed surface of composite article 10 when article 10 is placed in its intended environment and is therefore usually textured and may be provided with aesthetically pleasing detailing. Outer skin 14 is typically preformed and can be formed in the same mold used to form foam layer 12 and is usually molded to foam layer 12 during the formation of foam layer 12. Outer skin 14 can be a polyvinyl chloride, such as plastisol or drysol, or an acrylonitrile-butadiene-styrene resin.

Figure 3:
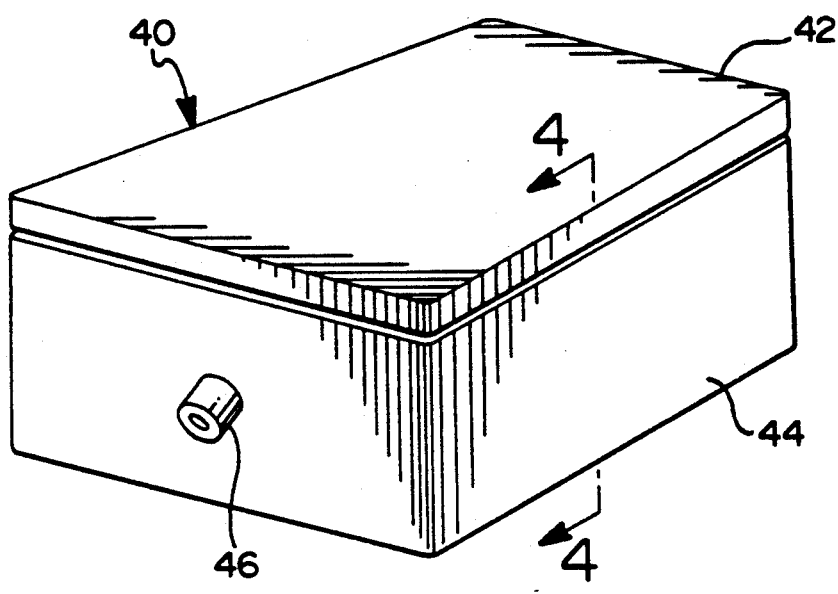
FIG. 3 is a perspective view of a mold for forming the composite plastic article of FIG. 1.
Figure 4:
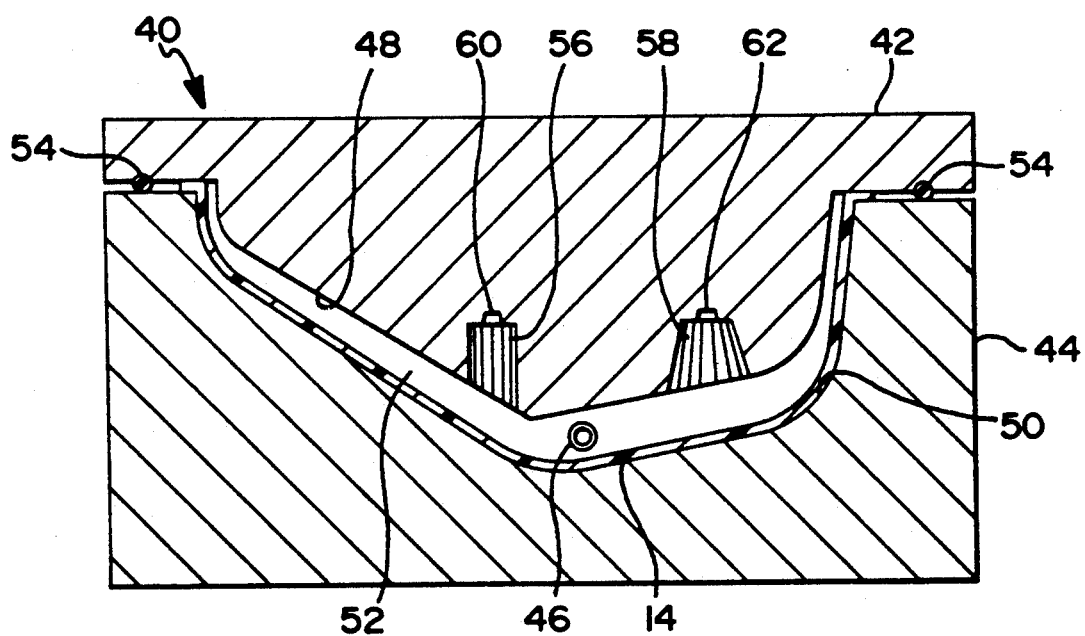
FIG. 4 is a cross-sectional view taken along the 4—4 line of FIG. 3, looking in the direction of the arrows and showing an outer skin loaded in the mold.

FIG. 3 depicts a closed foam mold 40 suitable for manufacturing composite plastic article 10. Mold 40 includes a removable lid or cover 42, a base 44, and an inlet 46 in base 44 for pouring a foaming resin into mold 40. Referring now to FIG. 4, lid 42 has an upper interior surface 48 that defines surface 22 of foam layer 12. Similarly, base 44 has a lower interior surface 50 that supportingly receives outer skin 14. Outer skin 14 contacts surfaces 48 and 50 of mold 40 at its edges to thereby define a closed cavity 52 between surface 48 and outer skin 14. A peripheral seal 54 located on lid 42 further protects against egress of foam material when forming foam layer 12. As will be hereinafter explained in greater detail, composite article 10 is formed by inserting a foaming resin such as polyurethane into cavity 52 via inlet 46 to form and co-mold foam layer 12 to outer skin 14.

Lid 42 includes mold recesses 56, 58 used to form bosses 18, 20, respectively. Recesses 56, 58 are generally cylindrical in shape, with the sides of recess 58 converging slightly toward the top of lid 42. Recesses 56, 58 include vents 60, 62, respectively, which permit the foaming resin to displace the air located in recesses 56, 58 during formation of foam layer 12.

In accordance with the present invention, mold 40 can be utilized to form composite article 10 by the following method. Outer skin 14 is preformed and then placed into mold 40. Fiberglass 28 is then placed over outer skin 14. Alternatively, chopped fiberglass can be metered in along with the foaming resin in a process known to those skilled in the art as Reinforced Reaction Injection Molding (RRIM). Fibrous material 24 is loaded into recesses 56, 58 either before or after outer skin 14 and fiberglass 28 are loaded. Polyurethane is poured into cavity 52 via inlet 46 and allowed to expand in an exothermic reaction to surround fiberglass 28, completely filling cavity 52, including recesses 56, 58. Although the polyurethane substantially encapsulates fibrous material 24, a portion of fibrous material 24 remains in contact with the walls of recesses 56, 58. As a result, fibrous material 24 transfers part of the heat generated by the exothermic reaction to lid 42 of mold 40. This reduces the localized heating of the polyurethane in and about recesses 56, 58 thereby reducing or eliminating cracking of bosses 18, 20 and blistering and delamination of outer skin 14. Alternatively, fibrous material 24 can be place upon fiberglass 28 such that it extends into recesses 56, 58 when lid 42 of mold 40 is place upon base 44. Other such variations of molding fibrous material 24 into bosses 18, 20 will become apparent to those skilled in the art and are intended to come within the scope of the appended claims.

In the broader aspects of the invention, foam layer 12, including bosses 18, 20 could be molded as a separate piece and thereafter affixed to outer skin 14 by an adhesive, molding, or the like. Upper surface 48 and lower surface 50 of mold 40 would therefore define the cavity into which the foam material is poured and would be designed to provide the desired shape to foam layer 12.

It will thus be apparent that there has been provided in accordance with the present invention a composite plastic article incorporating a fastening boss and a method for making the same which achieves the aims and advantages specified herein. It will of course be understood that the foregoing description is of preferred exemplary embodiments of the invention and that the invention is not limited to the specific embodiments shown. Various changes and modifications will be obvious to those skilled in the art and all such variations and modifications are intended to come within the spirit and scope of the appended claims.

I claim:

1. A composite plastic article, comprising:
   an outer skin layer; and
   a foamed resin layer co-molded to said skin layer along a first surface of said resin layer and having a unitary boss protruding from a second surface of said resin layer, said boss including a material dispersed therein having a high thermal conductivity.

2. An article as defined in claim 1, wherein said material comprises metal fibers.

3. An article as defined in claim 2, wherein said metal fibers comprise steel wool.

4. An article as defined in claim 2, wherein said foamed resin layer comprises fiberglass embedded within a thermoset foamed resin.

5. An article as defined in claim 4, wherein said thermoset foamed resin comprises urethane and said skin layer comprises a polyvinyl chloride.

6. An article as defined in claim 5, wherein said metal fibers comprise steel wool.

7. A method of forming a solid layer of resin in a mold, the layer of resin including a boss for fastening the layer of resin to an object and the mold including a recess for forming the boss, the method comprising the steps of:
   (a) placing a plug of metallic fibrous material into the recess;
   (b) forming the solid layer of resin within the mold by an exothermic reaction; and
   (c) conducting part of the heat generated by the exothermic reaction through the metallic fibrous material for dissipation into the mold.

8. The method of claim 7, wherein the resin comprises a composite compound including fiberglass and thermoset foam resin.

9. The method of claim 8, wherein the metallic fibrous material comprises steel wool, whereby at least some of the heat generated during step (c) is conducted to the mold via the steel wool.

10. The method of claim 9, further comprising the step of:
    (d) forming a skin layer in the mold prior to step (a).

11. A method of forming a reinforced layer of thermoset foamed resin between one surface of a mold and a preformed outer skin located on an opposite surface of the mold, the layer of resin having a unitary boss formed by a recess in the one surface of the mold, the method comprising the steps of:
    (a) placing a sheet of fiberglass over at least a portion of the outer skin;
    (b) placing a plug of metallic fibrous material onto the fiberglass;
    (c) placing the one surface of the mold opposite the outer skin such that the fibrous material extends into the recess;
    (d) inserting a resin between the one surface and the outer skin to substantially encapsulate the fiberglass and the fibrous material; and
    (e) curing the resin.

12. The method of claim 11, wherein the metallic fibrous material comprises steel wool, whereby heat released by the resin proximate the steel wool during step (e) is conducted to the mold via the steel wool.

* * * * *